United States Patent Office 3,275,444
Patented Sept. 27, 1966

3,275,444
PHOTOGRAPHIC SENSITIZING DYES AND EMULSIONS
Friedrich Bauriedel, Dreieichenhain, Werner Franke, Wiesbaden, and Hilde Lang, Neu Isenburg, Germany, assignors to E. I. du Pont de Nemours and Company, Wilmington, Del., a corporation of Delaware
No Drawing. Filed Dec. 10, 1964, Ser. No. 417,510
Claims priority, application Germany, July 2, 1964, A 46,481
5 Claims. (Cl. 96—105)

This invention pertains to new ternuclear sensitizing dyes and to silver halide photographic emulsions containing the ternuclear sensitizing dyes.

The probable structure of the ternuclear dyes of this invention can be represented by the following general formula:

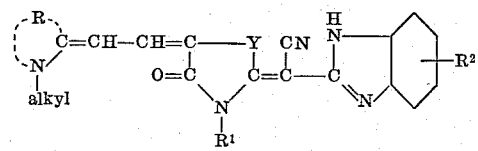

In this formula, R signifies the atoms necessary to complete with the N and C atoms a benzothiazole, benzoselenazole, benzimidazole or thiazoline ring, substituted or not; $R^1$ an alkyl or carboxyalkyl radical wherein the alkyl radical contains 1 to 3 carbon atoms; $R^2$ signifies H; alkyl of 1 to 2 carbon atoms; halogen, e.g., chlorine or bromine, or alkoxy of 1 to 2 carbon atoms; and Y signifies —S— or

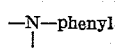

Suitable alkyl radicals include ethyl, methyl, and isopropyl radicals. The corresponding alkoxy radicals are useful.

The preferred ternuclear dyes of the invention contain two terminal rings derived from imidazole.

Ternuclear sensitizers in which a thiazolone or imidazolone ring is linked to two other heterocyclic rings by way of two methine bridges are known in the art of sensitizer chemistry under the name rhodacyanine dyes. These, however, are distinguished from the dyes to be used in accordance with this invention chiefly by the fact that they have the character of salts, do not have the CN group as a substituent in the monomethine chain, and also contain no basic benzimidazole nucleus. With respect to spectral sensitization the dyes to be employed in accordance with this invention are distinguished from the comparable rhodacyanines, among other properties, by the fact that they sensitize selectively in the red region of the spectrum and show a comparatively flat descent along the edges of the sensitization spectrum.

For many uses, e.g., for sensitizing films and papers for technical photography or for achieving sensitivity to green in multilayer products for color photography, it is necessary to have sensitizing dyes which provide selective sensitization in the green to yellow-green region of the spectrum.

The dyes provided in accordance with this invention are particularly well suited to those uses, since they sensitize in the range of about 520–600 millimicrons. Again, in contrast with the familiar carbocyanines or rhodacyanines, they do not carry the possibility of deleterious reactions or of ion exchange with other anions or salts present in the emulsion. In general, they are used in an amount from 60 to 100 mg. per mole of silver halide.

By this means, in turn, enhanced stability is achieved in sensitization effects obtained with these sensitizers alone or in admixture with other types of sensitizers, especially in emulsions containing dye coupling agents. Thus, they can be used to advantage in silver halide photographic emulsions which contain polymeric dye coupling aegnts. Polymeric dye coupling agents are described, for example, in French Patent 1,286,238.

Those dyes in particular which have two terminal heterocyclic rings derived from imidazole are distinguished, for example, in comparison with rhodacyanines, by sharply selective sensitization, a steep drop toward red and a sensitization peak at about 570 millimicrons. This especially suits them for attaining a high darkroom safety factor or good color separation when used in variously sensitized multiple layer products. This property especially suits the dyes to be employed in accordance with this invention to diffusion-resistant sensitization of the magenta (middle coating) layer of silver halide photographic emulsions containing dye coupling agents, and imparts to them a favorable color sensitivity for yellow-green and yellow tints.

Moreover, the dye types to be used in accordance with this invention are especially well adapted by the designated properties for sensitizing negative and copying materials in the graphic arts, as also halftone materials and reprographic products, in which even the yellow tints are required to be reproduced in the prints.

Dyes of this type are also suitable for sensitizing photographic record papers, which must not retain any disturbing residual color after exposure.

Preparation of the novel ternuclear dyes is effected in a simple manner and, by comparison with preparation of the familiar rhodacyanines, in much better yield, by quaternizing merocyanines in boiling inert organic solvents such as chlorobenzene, anisole, or phenetole, with dimethyl sulfate and subsequent reaction of the quaternary merocyanine salts, which crystallize at once in good purity, with 2-cyanomethylbenzimidazoles, substituted or not, in pyridine.

For optimum spectral sensitization of photographic emulsions it is not generally necessary to use more than 20–30 mg./kg. of emulsion and correspondingly more in the presence of dye coupling agents.

The sensitizing dyes may be added prior to digestion (maturation) while the emulsion is being digested or as an additive just before coating. Addition may be effected, for example, in ethanol or acetone solution.

The following examples will serve to explain the invention in more detail, without limiting its scope in any way:

Example 1

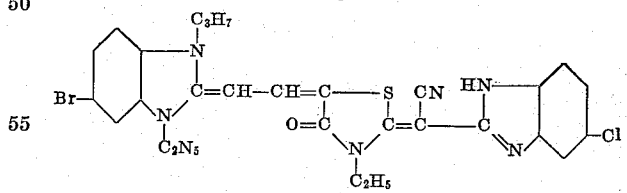

A solution is made of 12.5 g. 5-[(5-bromo-1-propyl-3-ethyl-2-benzimidazoline)-ethylidene]-3-ethylrhodanine in 25 ml. of boiling chlorobenzene and the boiling solution is treated with 3.6 g. dimethyl sulfate. The mixture is heated 15 minutes under a reflux condenser and allowed to cool. The crystals thus precipitated are filtered off with suction, washed with ether and dried. The quaternary salt thus obtained has in alcohol an absorption peak at 475 millimicrons. The yield of crude product is 15.8 g.

The resulting quaternary salt, 9.8 g., is dissolved with 3.95 g. of 5-chloro-2-cyanomethylbenzimidazole in 25 ml. of absolute pyridine and heated 15 minutes under a reflux condenser. On cooling, the sensitizer precipitates from the solution in the form of bluish-gray crystals. The crystals are filtered off with suction, washed first with very little methanol and then with ether, and recrystallized from ethanol. Yield: 3 g.

In ethanol solution the sensitizer shows an absorption peak at 538 millimicrons. Decomposition point 288–290° C.

When used in the amount of 100 mg. per mole of silver halide, the dye sensitized gelatin AgBr/I emulsions, containing 4–7 mol-percent iodide, up to 600 millimicrons with a pronounced peak at 575 millimicrons and a sharp descent toward the long-wave end of the spectrum.

*Example 2*

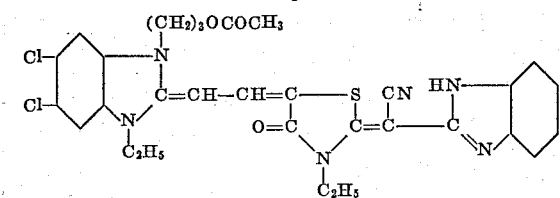

A solution is made of 13.5 g. 5-[(5,6-dichloro-1-acetoxypropyl-3-ethyl-2-benzimidazoline) - ethylidene] - 3-ethyl-rhodanine in 80 ml. of boiling chlorobenzene. Dimethyl sulfate, 6.8 g., is added dropwise to the boiling solution, the mixture is kept boiling for 5 minutes and then cooled. The precipitate is filtered off with suction, triturated with ether, filtered with suction again, washed with diethyl ether and dried. Yield: 12 g.

In ethanol solution the quaternary salt shows an absorption peak at 480 millimicrons.

The quaternary salt, 12 g. is heated 15 minutes under a reflux condenser with 3.2 g. 2-cyanomethylbenzimidazole and 50 ml. of dry pyridine. After cooling, the reaction mixture is treated with 1 liter of ether. The resulting dye forms a flocculant crystalline precipitate, which is filtered off with suction and washed with ether. Yield: 5.85 g.

The sensitizer can be recrystallized from dimethylformamide/diethyl ether. Absorption peak in ethanol: 540 millimicrons. Decomposition point 270–272° C.

When used in an amount of 90 mg. per mole of silver halide, the dye sensitized photographic gelatin AgCl/Br emulsions containing 30% bromide, up to 600 millimicrons, with a pronounced peak of sensitization at 575 millimicrons.

*Example 3*

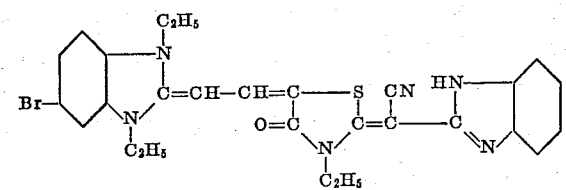

A solution is made of 9.5 g. 5[(5-bromo-1,3-diethyl-2-benzimidazoline)-ethylidene]-3-ethylrhodanine in 30 ml. of boiling chlorobenzene. To this is added 2.8 g. dimethyl sulfate dropwise and the mixture is then heated 5 minutes under a reflux condenser. After cooling, the precipitated crystals are filtered off with suction, washed with ether and dried. Yield 8.2 g.

In ethanol, the crystallized quaternary salt shows an absorption peak at 475 millimicrons.

The quaternary salt, 8.2 g., was heated to boiling 15 minutes in 10 ml. of dry pyridine with 2.5 g. 2-cyanomethylbenzimidazole. After cooling, the reaction product was precipitated with ether and purified chromatographically. Yield: 3.6 g. Decomposition point 291–292° C. Absorption peak in ethanol 536 millimicrons.

When used in an amount of 100 mg. per mole of silver halide, the dye sensitized photographic gelatin AgBr/I emulsions, containing up to 4–7 mol-percent iodide, up to 600 millimicrons with a pronounced sensitization peak at 580 millimicrons and a sharp drop toward the longwave side of the sensitization spectrum.

*Example 4*

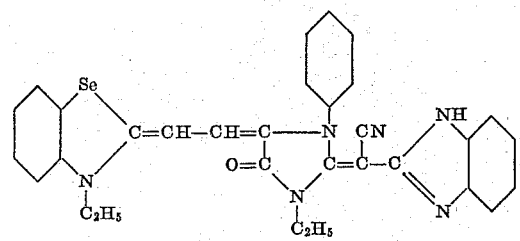

A mixture is made of 50 g. 5-[(3-ethylbenzselenazoline)-ethylidene]-1-phenyl-3-ethyl-2-thiohydantoin with 50 g. ethyl p-toluenesulfonate, and heated 2 hours at 135° C. After cooling somewhat, the solution is gradually sprayed with about 300 ml. of diethyl ether while stirring and triturating, until the dye forms a crystalline precipitate. It is allowed to stand 2–3 hours for thorough cooling and crystallization, filtered off with suction and washed with 200 ml. of ether. Yield: 68 g. Decomposition point 115–118° C. Absorption peak in methanol: 535 millimicrons.

The quaternary salt, 15 g., and 15 g. 2-cyanomethylbenzimidazole in 500 ml. dry pyridine are boiled under a reflux condenser 5 minutes, cooled and treated with 900 ml. of ether. The crude dye is filtered off with strong suction, washed with 100 ml. of ether and dissolved in 100 ml. of methanol, then precipitated with 200 ml. of 30% KI solution, filtered off with suction and recrystallized from 300 ml. of methanol. Yield: 2 g. Decomposition point 279–281° C. Absorption peak in methanol 566 millimicrons.

When used in an amount of 90 mg. per mole of silver halide, the dye sensitized gelatin AgCl/Br emulsions containing 30 mol-percent Br, with a peak at 580 millimicrons.

*Example 5*

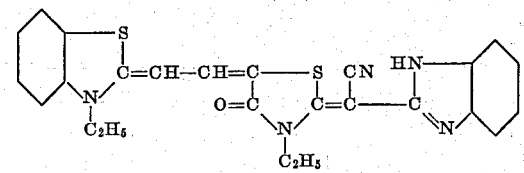

A solution is made of 0.85 5-[(3-ethylbenzthiazoline)-ethylidene]-3-ethylrhodanine in 15 ml. of boiling chlorobenzene and treated with 0.2 ml. of dimethyl sulfate, in the boiling solution. It is heated 3 minutes under a reflux condenser and allowed to cool. The precipitated crystals are filtered off with suction and washed with ether. Yield: 1 g. Absorption peak in ethanol: 537 millimicrons.

A solution is made of 1 g. quaternary salt and 0.5 g. 2-cyanomethylbenzimidazole in 10 ml. of dry pyridine and is heated 15 minutes under a reflux condenser. The dye precipitates even during the boiling. It is filtered off with suction, washed with diethyl ether, and treated with acetone for purification. Yield: 700 mg. Absorption peak in ethanol: 540 millimicrons.

The dye sensitized photographic AgCl/Br/gelatin emulsions containing 30 mol-percent Br, with a peak at 580 millimicrons.

*Example 6*

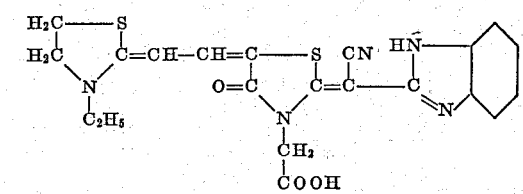

A solution is made of 3.3 g. 5-[(3-ethylthiazolyline)-ethylidene]-3-carboxymethyl-ethylrhodanine in 20 ml. of boiling chlorobenzene and the boiling solution is heated 3 minutes under a reflux condenser with 1 ml. of dimethyl sulfate. The precipitated dye is filtered off with suction and washed with ether. Yield: 3.7 g. Absorption peak in ethanol: 485 millimicrons.

The quaternary salt, 3.2 g., and 1.6 g. 2-cyanomethyl-benzimidazole are separately dissolved, with heating, in ethanol and the two solutions are combined. The dye crystallizes out on long standing at room temperature. It is filtered off with suction, washed with ether and treated with acetone for further purification. Yield: 2.4 g. Absorption peak in ethanol 497 millimicrons.

When used in an amount of 90 mg. per mole of silver halide, the dye sensitized photographic gelatin AgCl/Br emulsions with 30 mol-percent bromide up to 590 millimicrons with a peak at 535 millimicrons.

*Example 7*

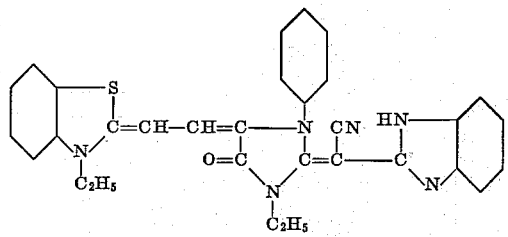

A solution is made of 0.4 g. 5-[(3-ethylbenzthiazoline)-ethylidene]-1-phenyl-3-ethyl-2-thiohydantoin in 7 ml. of boiling chlorobenzene and the boiling solution is heated 3 minutes under a reflux condenser with 0.5 ml. of diethyl sulfate. The quaternized dye precipitates in the cold, is filtered off with suction and washed with ether.

The quaternized dye is then treated with 2-cyanomethylbenzimidazole in pyridine as in Example 4. The dye forms acicular red crystals which show an absorption peak in ethanol at 565 millimicrons and sensitized photographic AgCl/Br/gelatin emulsions containing 30 mol-percent bromide, with a peak at 580 millimicrons.

*Example 8*

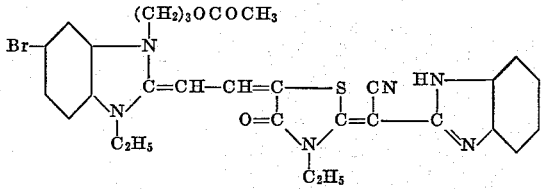

A solution is made of 7.2 g. 5-[(6-bromo-1-acetoxypropyl-3-ethyl-2-benzimidazoline)-ethylidene]-3-ethylrhodanine in 30 ml. of boiling chlorobenzene and 3.6 g. dimethyl sulfate is added dropwise to the boiling solution. The mixture is kept boiling 5 minutes, cooled, the precipitated crystals are filtered off with suction, washed with diethyl ether and dried. Yield: 8.6 g.

The quaternary merocyanine salt thus obtained, 8.6 g., is heated with 2.4 g. 2-cyanomethylbenzimidazole in 10 ml. of dry pyridine 15 minutes under a reflux condenser. After cooling the resulting crystals are filtered off with suction and recrystallized from chlorobenzene. Yield 3.5 g. The absorption peak in ethanol solution is at 536 millimicrons. Decomposition point 242-244° C.

The compound sensitized photographic AgBr/I emulsions which contained 4–7 mol-percent iodide up to 600 millimicrons. A pronounced sensitization peak is obtained at 580 millimicrons, and a steep descent toward the long-wave end of the sensitization spectrum.

*Example 9*

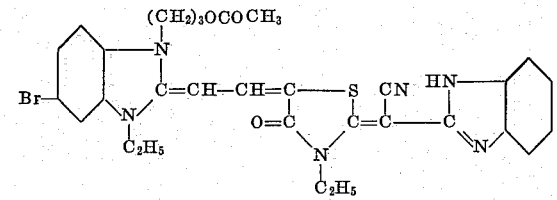

A solution is made of 6 g. 5-[(5-bromo-1-acetoxypropyl - 3 - ethyl - 2 - benzimidazoline)-ethylidene]-3-ethylrhodanine in 30 ml. of boiling chlorobenzene and 2.3 g. dimethyl sulfate is added dropwise. After heating 5 minutes under a reflux condenser, the mixture is cooled, the crystals thus formed are filtered off with suction, washed with diethyl ether and dried. Yield 6.5 g. of crystalline quaternary salt. The quaternary salt thus obtained, 6.5 g., is heated with 1.4 g. 2-cyanomethylbenzimidazole in 8 ml. of dry pyridine 15 minutes under a reflux condenser. After cooling, the precipitated crystals are filtered off with suction, washed with methanol and recrystallized from ethanol. Yield: 2.95 g.

In ethanol solution the dye has an absorption peak at 537 millimicrons and a decomposition point of 259–261° C. When used in an amount of 60 mg. per mole of silver halide, the dye sensitized photographic gelatin AgCl/Br emulsions containing 30 mol-percent bromide, with a peak at 580 millimicrons and a steep descent toward the long-wave end of the spectrum.

The invention is not limited to the sensitization of the specific gelatino-silver halide emulsions of the type given in the above examples. It may be applied to other simple and mixed silver halide emulsions. The emulsions can obtain binding agents other than gelatin or mixtures of gelatin and such binding agents. Suitable binding agents include polyvinyl alcohol and acetals thereof, polyvinyl pyrrolidone, polyvinyl lactams, cellulose esters, dextrin and dextran, the latter two being mixed with gelatin.

The emulsions can contain color formers and other emulsion adjuvants including non-optical sensitizers such as sulfur sensitizers containing labile sulfur, e.g., allyl isothiocyanate, allyl diethyl thiourea, phenyl isothiocyanate and sodium thiosulfate, the polyoxyalkylene ethers in Blake et al., U.S. 2,400,532, and the polyglycols disclosed in Blake et al., U.S. 2,432,549. Other non-optical sensitizers such as amines as taught by Staud et al., U.S. 1,925,508 and metal salts as taught by Baldsiefen et al., U.S. 2,540,086 may also be used. Antifoggants, e.g., benzotriazole and triazaindenes, can be used as well as the usual hardeners, i.e., chrome alum, formaldehyde, etc.

The emulsion may be coated on any suitable support such as paper or films composed of cellulose esters, e.g., cellulose triacetate, cellulose acetate/butyrate; superpolymers, e.g., poly(vinyl chloride co vinyl acetate) polyvinyl acetals, e.g., formals, acetals; polystyrene; polyamides, e.g. polyhexamethylene adipamide, and polyesters, e.g. polyethylene terephthalate, polyethylene terephthalate/isophthalate; esters formed by condensing terephthalic acid and dimethyl terephthalate with propylene glycol, diethylene glycol, tetramethylene glycol or cyclohexane - 1,4 - dimethanol (hexahydro-p-xylene alcohol). The vinylidene chloride copolymer-coated oriented polyester films of Alles U.S. 2,779,684 are especially suitable.

We claim:

1. A photographic silver halide emulsion containing sensitizing amounts of a ternuclear dye of the formula

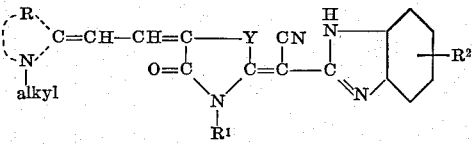

wherein R constitutes the atoms necessary to complete with the intracyclic N and C atoms a cyclic nucleus selected from the group consisting of benzothiazole, benzoselenazole, benzimidazole and thiazoline nuclei, $R^1$ is a member selected from the group consisting of alkyl and carboxylalkyl, $R^2$ is a member selected from the group consisting of H, alkyl, chlorine, bromine and alkoxy, and Y is a member selected from the group consisting of —S— and

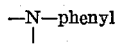

2. A photographic silver halide emulsion layer containing sensitizing amounts of a dye of the formula:

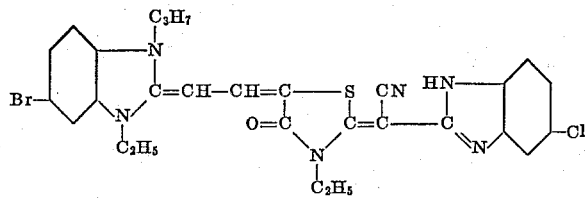

3. A photographic silver halide emulsion layer containing sensitizing amounts of a dye of the formula:

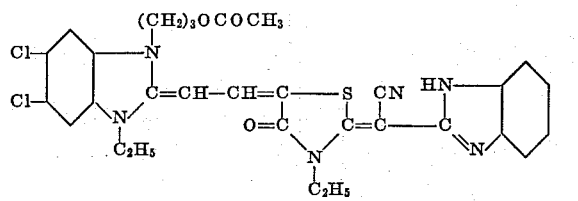

4. A photographic silver halide emulsion layer containing sensitizing amounts of a dye of the formula:

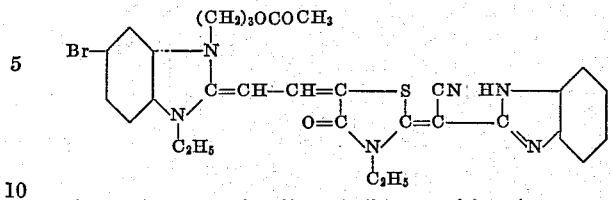

5. A photographic silver halide emulsion layer containing sensitizing amounts of a dye of the formula:

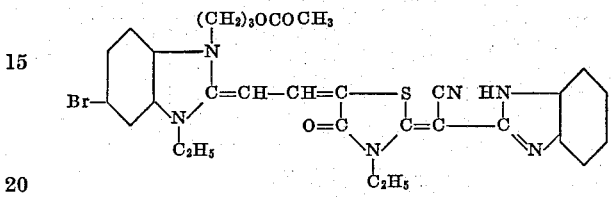

References Cited by the Examiner
UNITED STATES PATENTS

| | | | |
|---|---|---|---|
| 2,304,981 | 12/1942 | Wilmanns | 96—106 |
| 2,870,014 | 1/1959 | Brooker et al. | 96—106 |
| 2,895,955 | 7/1959 | Haseltine et al. | 260—240.6 |
| 2,918,369 | 12/1959 | Doorenbos | 96—106 |
| 2,947,630 | 8/1960 | Jones | 96—105 |
| 2,984,664 | 5/1961 | Fry et al. | 260—240.5 |

J. TRAVIS BROWN, *Acting Primary Examiner.*